F. L. WILKENS.
Corn Planter.
No. 97,739.          Patented Dec. 7, 1869.
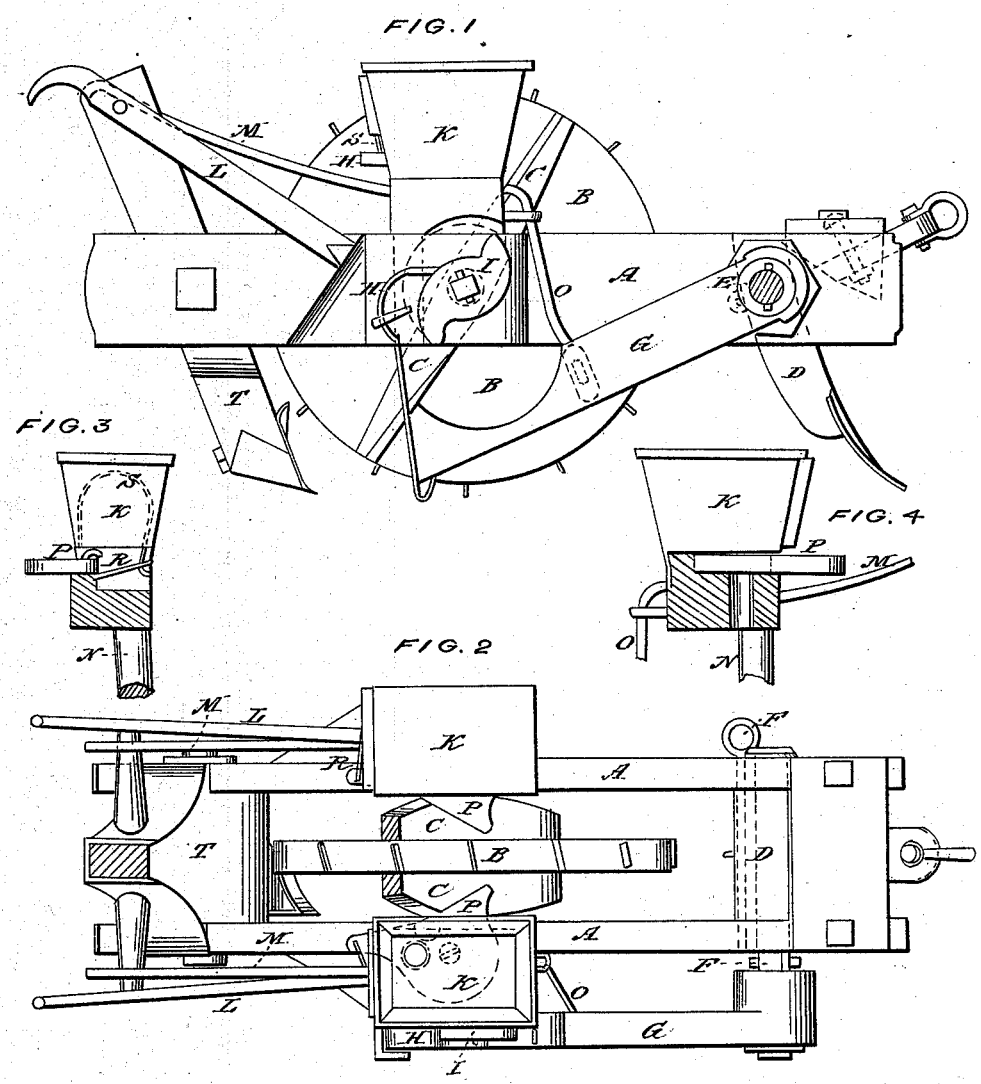

United States Patent Office.

F. L. WILKENS, OF ST. MARY'S, OHIO.

Letters Patent No. 97,739, dated December 7, 1869; antedated December 4, 1869.

---

IMPROVEMENT IN CORN-PLANTERS.

---

The Schedule referred to in these Letters Patent and making part of the same.

---

*To all whom it may concern:*

Be it known that I, F. L. WILKENS, of St. Mary's, in the county of Auglaize, and in the State of Ohio, have invented certain new and useful Improvements in Corn-Planters; and do hereby declare that the following is a full, clear, and exact description thereof, reference being had to the accompanying drawings, and to the letters of reference marked thereon, making a part of this specification.

The nature of my invention consists in the construction of a cheap and easily-managed corn-planter, and consists in the arrangement of the devices hereafter set forth and explained.

Figure 1 is a side view of my machine.
Figure 2 is a plan view of the same.
Figures 3 and 4 are different views of the seed-boxes.

Letter A represents the frame of my machine, which may be of any suitable size or shape, and which has a plow attached to each end.

Placed in the middle of this frame is the large driving-wheel B, which has a number of sharp projections upon its periphery.

Placed upon each side of this wheel, there is a cam, C, which operates the slides in the seed-boxes.

The front plowshare D is pivoted between the sides of the frame, and turns upon the axle E, so that it can be raised clear from the ground, when not needed, and is held in this position by means of the rod F.

There are two holes made in each side of the frame, through which this rod passes.

Upon the back of the plow, there is placed a staple or loop, so that the rod can serve as a brace when the plow is in use, and serve as a support in holding it up when not needed.

The axle E extends to some distance beyond the frame, on one side, so as to serve as a pivot to the marker G.

This marker consists of a long bar, extending backward, having a slot cut through from its inner side, and has a curved arm, H, projecting upward from its back end.

One end of the axle, upon which the driving-wheel turns, extends beyond the frame, upon which is placed the S-shaped cam I, which operates the marker.

As this axle revolves, the cam catches in the curved arm H, raises it to a certain point, and then lets it suddenly drop, so that the sharp projection upon the end will mark the ground just opposite where there is a hill of corn covered.

Upon each side of the frame A, a little back of the centre, there is secured a block, upon which the seed-boxes K rest, and to which the lower end of the handles L are fastened.

Through each of these blocks, there is a hole made, in which the rods N, projecting downward from the bottom of the seed-boxes, fit, so that the boxes can be turned partly around, to throw them in and out of gear.

Attached to each one of these boxes, there is a lever, M, which extends back to where the handles are held by the hand, so that the boxes can be operated.

Fastened to the front of the seed-box, on the same side as the marker, there is placed a long rod, O, the end of which is bent, so as to catch in the slot cut in the side of the marker.

When the lever M is pressing against the handle, the marker is free to be operated, but when it is moved over toward the centre, the bent end catches it, and holds it up from the ground.

In each one of the seed-boxes, there is placed a slide, P, the outer end of which projects out, so as to be operated by the cams C on the driving-wheel.

To the back end of these slides, there is a short arm, R, which is attached to a spring, S, placed in the end of the box, as seen in fig. 3, so as to draw the slide back to its original position.

When it is not desired to use the boxes, the levers M are moved over toward the centre, so that they are moved far enough around to prevent the slides from being operated.

As the grain is passed from the boxes, it falls through openings, prepared for it, to the ground.

The number of cams upon the wheel, for operating the slides, can be arranged to regulate the distance between the hills, as may be desired.

Having thus described my invention,

What I claim, and desire to secure by Letters Patent, is—

1. The seed-boxes K, when provided with the projections N, in combination with the slides P, arm R, and spring S, when used substantially in the manner and for the purpose set forth.

2. The marker G, when provided with a slot upon its inner side, and with curved arm H, when used in the manner and for the purpose specified.

3. The levers M, in combination with the seed-boxes K, slides P, and cam-wheel B, when used substantially in the manner as described.

4. The marker G, and arm H, in combination with the cam I and rod O, when used substantially as set forth.

5. The plows D and F, cam-wheel B, marker G, provided with arm H, rod O, and cam I, in combination with the levers M, seed-boxes K, and slides P, when all are arranged in the manner and for the purpose substantially as set forth and described.

In testimony that I claim the foregoing, I have hereunto set my hand and seal, this 5th day of May, 1869.

F. L. WILKENS. [L. S.]

Witnesses:
L. C. SAWYER,
S. R. MOTT.